United States Patent [19]
Nicholls

[11] 3,883,126
[45] May 13, 1975

[54] GAS SPRINGS

[75] Inventor: Lawrence George Nicholls, Birmingham, England

[73] Assignee: Girling Limited, Birmingham, England

[22] Filed: Jan. 17, 1974

[21] Appl. No.: 434,283

[30] Foreign Application Priority Data
Jan. 19, 1973 United Kingdom................. 2982/73

[52] U.S. Cl................................. 267/65 R; 296/76
[51] Int. Cl................................................. F16f 5/00
[58] Field of Search............... 296/56, 76; 267/65 R

[56] References Cited
UNITED STATES PATENTS
2,996,210  8/1961  Thomas .............................. 296/76
3,157,429  11/1964  Harms et al. ........................ 296/76

Primary Examiner—James B. Marbert
Attorney, Agent, or Firm—Scrivener, Parker, Scrivener and Clarke

[57] ABSTRACT

A gas spring comprises a piston rod reciprocable into and out of a cylinder body between a rectracted and an extended position, and a manually releasable latching device, preferably mounted on the cylinder body, which is operative to prevent substantial movement from the retracted position of the piston rod relative to the cylinder body.

7 Claims, 3 Drawing Figures

FIG. I.

GAS SPRINGS

This invention relates to gas springs.

In vehicles having tailgates which are hinged at the top edge it is known to fit a gas spring between the vehicle body and the tailgate. The gas spring provides a force which assists in opening of the tailgate and also supports the tailgate in its open position. However, if there is a loss of gas spring pressure the spring will collapse and there will be uncontrolled closing of the tailgate. Since it is most likely that the tailgate will be opened for loading or unloading of the vehicle, there is a risk that the person loading or unloading the vehicle may suffer injury as a result of the uncontrolled closing.

The present invention provides a gas spring comprising a cylinder body, a piston rod slidable into and out of the body between a retracted and an extended position, and mechanical latching means operative in the extended position to prevent substantial relative movement between said piston rod and cylinder body, said latching means being manually releasable to permit said relative movement.

The gas spring cannot be collapsed without manual release of the latching means so that when fitted to a vehicle tailgate it will not collapse and allow the tailgate to drop and cause injury to a person loading the vehicle.

Figure 2:
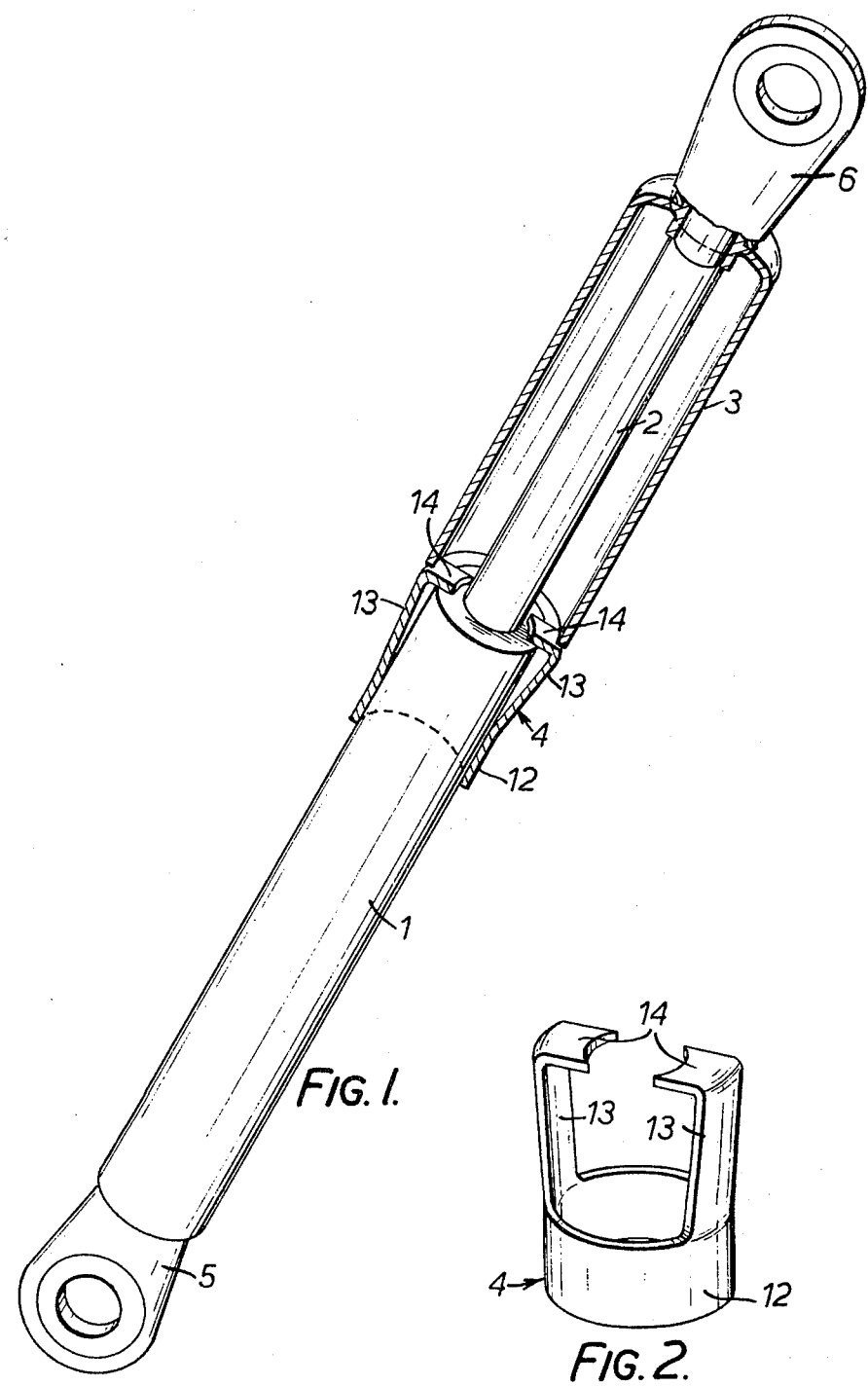
Figure 3:
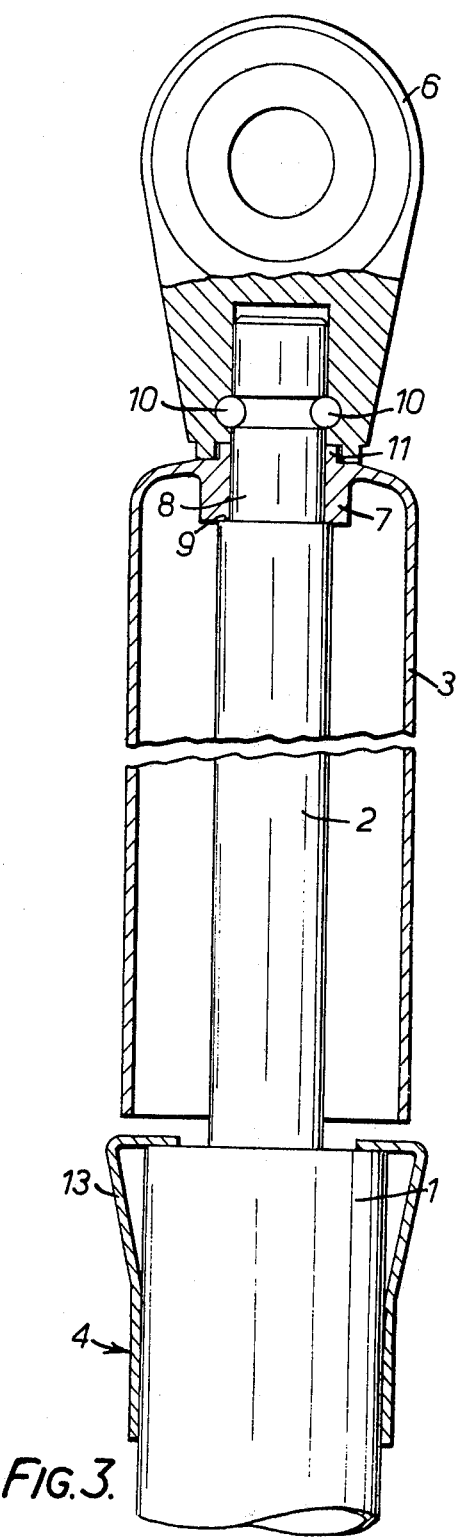

A gas spring in accordance with the invention will now be described, by way of example, with reference to the accompanying drawings, in which:

FIG. 1 is a perspective view, partly in section, of the gas spring in its extended condition, FIG. 2 is an enlarged perspective view of a latch device of the gas spring, and FIG. 3 is an enlarged fragmentary view, partly in section, of a modified form of the spring of FIG. 1.

The gas spring comprises a spring unit having a cylinder body 1 and a piston rod 2 slidable into and out of the cylinder body, a cylindrical member 3 which acts as a dirt shield attached to the free end of rod 2 and surrounding the rod, and a latch device 4.

The unit may be of any suitable form and has mounting members 5 and 6 secured to the free ends of the cylinder body 1 and rod 2 respectively.

As is clearly shown in FIG. 3, the dirt shield 3, which is preferably of plastics material, has a downwardly directed annular boss 7 at one end which is a push fit on a reduced diameter portion 8 of rod 2 and which abuts a shoulder 9 formed on the rod. The mounting member 6 has a bore which receives the portion 8 or rod 2 and a counterbore which receives an upwardly directed annular boss 11 of the dirt shield. The dirt shield 3 is thus held in position between the shoulder 9 of the rod and the mounting member 6, which is secured to the rod 2 by roll pins 10 in known manner.

The latch device 4 is in the form of a spring clip having an annular portion 12 which fits over the cylinder body 1 and a pair of diametrically opposed arms 13 integral with the annular portion. The arms 13 extend generally longitudinally of the device and radially outwardly of the annular portion 12 and have their free ends bent over to provide radially inwardly directed abutment portions 14 which extend laterally between the dirt shield and the end of the cylinder body 1. The device 4 is mounted on the cylinder body 1 with its arms 13 directed towards the rod 2 and with its abutment portions 14 close to but clear of the inner end face of the cylinder body 1. The device shown is a friction fit on the cylinder body 1, but it may be secured to the body in any suitable manner.

In the extended position of the gas spring shown in FIG. 1, the inherent resilience of the arms 13 biases them apart and the inner end of the dirt shield 3 engages the abutment portions 14 to prevent compression of the spring. When the spring is to be compressed the arms 13 are pushed radially inwardly by finger pressure and the dirt shield 3 is permitted to ride telescopically over the arms 13 and the cylinder body 1, the dirt shield 3 retaining the arms 13 in their radially inner positions against their resilience. When the spring is once again permitted to expand the dirt shield 3 rides over the arms 13 until it is clear of them and the arms then expand due to their inherent resilience and automatically latch the dirt shield 3 and cylinder body 1 against relative movement. It will be appreciated that the annular portion 12 of the device 4 must have a greater frictional grip on the body 1 than the arms have on the inner cylindrical surface of the shield 3 during extension of the spring so that the device 4 is not pulled from the cylinder body by the dirt shield.

The spring is particularly useful for supporting a downwardly extending tailgate of a vehicle in its raised position hingedly connected along its top edge to the vehicle body. The mounting members 5 and 6 are then pivotally connected to the vehicle body and the tailgate respectively. The spring is in its compressed state when the tailgate is closed and locked in position and when the tailgate is released the spring expands under the action of the gas to the position of FIG. 1 in which the tailgate is supported in its open position. If there is a reduction in gas pressure through leakage, the spring will not compress and allow the tailgate to close uncontrollably, which could be dangerous if a person is loading or unloading the vehicle at the time, but it will be held in its extended position by the interengagement of the latch device 4 and the dirt shield 3.

FIG. 3 illustrates a small modification in that the dirt shield 3 is axially spaced from the abutment portions 14 of the device 4, when the gas spring is in its extended position. In this case, if there is any leakage from the gas spring the dirt shield will sink to the abutment portions 14, i.e. to the position shown in FIG. 1, and this movement will in itself be an indication of leakage. Engagement between the dirt shield 3 and the abutment portions 14 will provide some frictional resistance to movement of the arms 13 and for tailgate closure it will be necessary to lift the tailgate to move the dirt shield away from the abutment portions before operating the latch device. This reduces the likelihood of the operator trapping his fingers in the dirt shield.

In normal operation of the spring of FIG. 3, it is necessary for the operator to apply a downward force on the gas spring to close the tailgate, and since this movement is slow and effected by the operator himself the risk of his fingers being trapped is minimised.

I claim:

1. A gas spring comprising a cylinder body having one end closed, a piston rod reciprocable into and out of the cylinder body through the other end thereof between a retracted and an extended position of said spring, gas under pressure in said cylinder body operating at all times against the cross sectional area of said rod to urge it towards the extended position of said spring, and mechanical latching means operative in said extended position to prevent substantial relative movement between said piston rod and said cylinder body, said latching means being manually releasable to permit such relative movement.

2. A gas spring according to claim 1, wherein said latching means, comprises a generally tubular member carried by said piston rod and telescopically cooperable with said cylinder body, said tubular member being axially separated from said cylinder body in the extended position, and releasable means preventing telescoping of said tubular member and said cylinder body.

3. A gas spring according to claim 2, wherein said releasable means comprises at least one inherently resilient arm having a portion which extends laterally between said tubular member and said cylinder body in said extended position, said arm being manually movable against said inherent resilience to permit telescoping of said cylinder body and said tubular member.

4. A gas spring according to claim 3, wherein said releasable means is mounted on said cylinder body, and wherein said tubular member is movable telescopically over both said releasable means and said cylinder body to said retracted position upon release of said latching means.

5. A gas spring according to claim 3, wherein said tubular member is normally axially spaced from the or each said laterally extending portion in said extended position.

6. A gas spring for lifting and supporting a hinged tailgate part of a vehicle relative to a vehicle body part, said gas spring comprising a cylinder body for connection to one of said parts, a piston rod for connection to the other of said parts, gas under pressure in said cylinder body operating at all times against the cross sectional area of said rod to urge it towards the extended position of said spring, said piston rod being reciprocable into and out of said cylinder between a fully retracted position in which the tailgate is fully open, and mechanically latching means which prevents substantial movements of said piston rod into said cylinder from said fully extended position in the event of failure of gas pressure in said spring, wherein said latching means includes means providing an indication of such failure.

7. A gas spring in accordance with claim 5 including visual gas pressure failure indicating means provided by the elimination of said normal axial spacing due to the sinking of said tubular member into engagement with said laterally extending portion upon failure of the gas pressure in said spring.

* * * * *